Patented Dec. 12, 1933

1,939,025

UNITED STATES PATENT OFFICE 1,939,025

AROMATIC AMINO-SULPHO CHLORIDES, SUBSTITUTED IN THE AMINO-GROUP

Hugo Schweitzer and Karl Burr, Wiesdorf, near Cologne-on-the-Rhine, Germany, assignors to I. G. Farbenindustrie Aktiengesellschaft, Frankfort-on-the-Main, Germany, a corporation of Germany No Drawing. Application October 22, 1929, Serial No. 401,622, and in Germany October 26, 1928

10 Claims. (Cl. 260—124)

The present invention relates to a process of preparing aromatic amino-sulpho chlorides, substituted in the amino-group and to the new products obtainable thereby, more particularly it relates to compounds of the probable general formula:

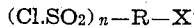

wherein R stands for an aromatic nucleus, such as a benzene or naphthalene nucleus which may be substituted by an alkyl or a hydroxy group, X stands for an amino group in which one hydrogen atom may be substituted by alkyl, aralkyl, aryl, acyl or the radical of a heterocyclic nucleus attached to the nitrogen atom of the amino group by means of a carbon atom, for example, for the residue of the cyanuric nucleus, wherein the other hydrogen of the amino group may be substituted by alkyl, aralkyl, aryl, acyl, and wherein one or both hydrogen atoms may be substituted in such a manner that the nitrogen of the amino group is member of a 5- or 6-membered heterocyclic nucleus attached to the aromatic nucleus R in ortho- or peri-position to the amino group, and "$n$" stands for one of the numbers one to three.

Our new products are prepared by causing to react upon each other, chlorosulphonic acid and an aromatic aminosulphonic acid, substituted in the amino-group and which may be represented by the probable general formula:

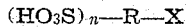

R, X and $n$ meaning the same as stated above.

The temperature and duration of the reaction, as well as the relative quantities of N-substituted aminosulphonic acids and chlorosulphonic acid can be varied in wide limits; the process may be carried out say between about 0° C. and about 140° C., and the reaction is complete either immediately after mixing together the two components or may last some hours or even several days, depending on the specific N-substituted aminoarylsulphonic acid used and the temperature at which the process is carried out. According to the working conditions and the constitution of the aromatic aminosulphonic acid substituted in the amino group employed either the corresponding amino sulphochloride is obtained or further sulphochloride residues are introduced into the molecule.

From the reaction mixture the amino sulpho chlorides may be isolated by pouring the mixture onto ice and may be purified by recrystallization from a suitable organic solvent. They are generally colorless to red crystallized substances, rather stable, soluble in organic solvents, showing a high capability of reacting, and split off hydrochloric acid on heating with water which may contain an alkali or alcohol.

The invention is illustrated by the following examples, without being limited thereto:

*Example 1.*—100 parts by weight of 2-acetylamino-5-naphthol-7-sulphonic acid are introduced with cooling into 600 parts by weight of chlorosulphonic acid. The mixture is left to stand for 48 hours at ordinary temperature and then poured on ice; the 2-acetylamino-5-naphthol-7-sulphochloride, which separates, is filtered and dissolved in ether. After separating from a little impurity, drying and concentrating the ethereal solution the sulphochloride crystallizes out in yellowish crystals. It does not melt even at 290° C. but swells up at about 180° C. It is readily soluble in glacial acetic acid and in acetone.

*Example 2.*—100 parts by weight of 2-acetylamino-8-naphthol-6-sulphonic acid are introduced with cooling into 600 parts by weight of chlorosulphonic acid. The mixture is left to stand for 48 hours at ordinary temperature, then poured onto ice and worked up as described in Example 1. The 2-acetylamino-8-naphthol-6-sulphochloride is a yellowish crystalline powder which does not melt. It dissolves readily in glacial acetic acid and in acetone.

*Example 3.*—50 parts by weight of the sodium salt of 1-acetylamino-naphthalene-4-sulphonic acid are introduced into 250 parts by weight of chlorosulphonic acid with good cooling in the course of 1–2 hours. The reaction mixture is allowed to stand over night at ordinary temperature and is then poured onto ice. The 1-acetylaminonaphthalene-4-sulphochloride separates in white flakes, which are filtered by suction and washed till free from acid. For the further purification the dried reaction product is recrystallized, for example, from chlorobenzene.

The product takes the form of yellowish colored crystals, which melt at about 170° C.

*Example 4.*—100 parts by weight of 1-acetylamino-8-napthol-3.6-disulphonic acid are introduced with good cooling into 800 parts by weight of chlorosulphonic acid. After standing for about one hour at ordinary temperature the reaction mixture is heated for 8 hours on the water bath and poured onto ice after cooling. The 1-acetylamino-8-naphthol-3.6-disulphochloride separates out in flakes, which are filtered by suction and dissolved in ether. After drying the ethereal solution the ether is distilled off and the raw product thus obtained is further purified by recrystallizing from ether in the presence of a little animal charcoal.

The product takes the form of yellow crystals, melting at about 188-189° C.

Further examples are indicated in the following table:—

The following substances are obtained: Approximate melting point

From 1-acetylamino-8-naphthol-4.6-disulphonic acid the 1-acetylamino-8-naphthol-4.6-disulphochloride; yellow crystals from ether _____ 145-147°

From 1-benzoylaminonaphthalene-6-sulphonic acid the 1-benzoylaminonaphthalene-6-sulphochloride: weakly yellowish colored crystals (chlorobenzene) _____ 185-186°

From carbonyl-2.1-aminophenol-4-sulphonic acid of the formula:

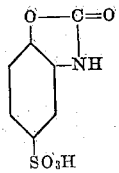

the carbonyl-2.1-aminophenol-4-sulphochloride: colorless crystals (glacial acetic acid) _____ 230-231°

From carbonyl-2.1-aminophenol-4.6-disulphonic acid the carbonyl-2.1-aminophenol-4.6-disulphochloride: colorless crystals (chlorobenzene) _____ 210-214°

From carbonyl-1.2-aminonaphthol-4-sulphonic acid a carbonyl-1.2-aminonaphthol-disulphochloride: almost colorless crystals (acetone) _____ 262-263° with decomposition From carbonyl-1.8-aminonaphthol-3.6-disulphonic acid the carbonyl-1.8-aminonaphthol-3.6-disulphochloride: yellowish crystals (chlorobenzene) _____ 214-216°

From 2-methylbenzoxazole-5-sulphonic acid of the formula:

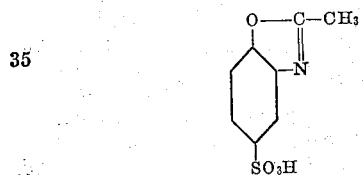

the corresponding sulphochloride: colorless crystals (acetic acid) _____ 189-190° with decomposition From 2-hydroxyperimidine-5.8-disulphonic acid of the formula:

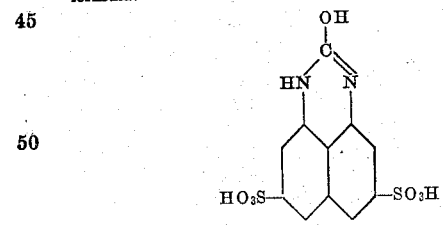

the corresponding disulphochloride: yellowish crystals (glacial acetic acid) _____ decomposition at 250°, no melting point From 2-methylperimidine-6-sulphonic acid of the formula:

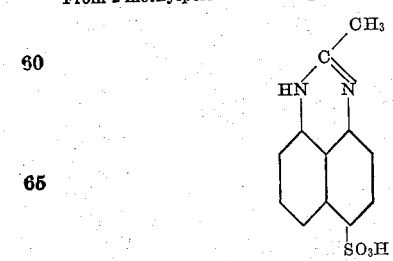

a disulphochloride: yellow crystals (chlorobenzene) _____ 200-204°

From diphenylurea-4.4'-disulphonic acid the diphenylurea-4.4'-disulphochloride: colorless crystals.

From 2-methylamino-1-methylbenzene-4-sulphonic acid the 2-methylamino-1-methylbenzene-4-sulphochloride: yellow crystals (benzene) _____ 99-100°

From dimethylaniline-3-sulphonic acid the dimethylaniline-3-sulphochloride: yellow crystals (ether) _____ 38°

From dimethylaniline-4-sulphonic acid the dimethylaniline-4-sulphochloride: yellow crystals from ether _____ 108-111°

The diazoxyd acid of the formula:

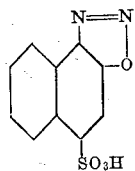

80 obtained from 1-amino-2-naphthol-4-sulphonic acid leads to a diazoxyd disulphochloride in the form of yellow crystals _____ 131-132°

From 2-dimethylaminonaphthalene-5-sulphonic acid two isomeric monosulphochlorides: 1) yellow crystals (ether) 86°
2) red crystals (ether) _____ {1 86°
{2 108-110°

We claim:

1. The process which comprises causing chlorosulphonic acid to react upon an aromatic aminosulphonic acid substituted in the amino-group of the probable general formula:

$$(HO_3S)_n-R-X$$

wherein R stands for an aromatic nucleus, X stands for an amino group, one hydrogen atom of which may be substituted by substituents of the group consisting of alkyl, aralkyl, aryl, acyl and the radical of a heterocyclic nucleus attached to the nitrogen atom of the amino-group by means of a carbon atom and the other hydrogen atom of the amino group is substituted by a substituent of the group consisting of alkyl, aralkyl, aryl, acyl and wherein one or both hydrogen atoms may be substituted in such a manner that the nitrogen atom of the amino-group is member of a 5- or 6-membered heterocyclic nucleus attached to the aromatic nucleus R in ortho- or peri-position to the substituted aminogroup, and "n" stands for one of the numbers one to three.

2. The process which comprises causing chlorosulphonic acid to react upon an aromatic aminosulphonic acid substituted in the amino-group of the probable general formula:

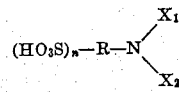

wherein R stands for an aromatic nucleus, which may be substituted by an alkyl or a hydroxy group, $X_1$ stands for hydrogen which may be substituted by substituents of the group consisting of alkyl, aralkyl, aryl, acyl and the radical of a heterocyclic nucleus attached to the nitrogen atom of the amino-group by means of a carbon atom, $X_2$ stands for a substituent of the group consisting of alkyl, aralkyl, aryl, acyl, and "n" stands for one of the numbers one to three.

3. The process which comprises causing chlorosulphonic acid to react upon an aromatic aminosulphonic acid substituted in the amino-group of the probable general formula:

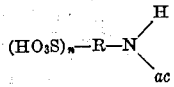

wherein R stands for an aromatic nucleus which may be substituted by a hydroxy or an alkyl group, "ac" stands for an acyl radical and "n" for one of the numbers one to three.

4. The process which comprises causing chlorosulphonic acid to react upon 2-acetylamino-8-naphthol-6-sulphonic acid for about 48 hours at room temperature.

5. As new products aromatic amino-sulpho-chlorides substituted in the amino-group of the probable general formula:

$$(Cl \cdot SO_2)_n\text{—}R\text{—}X$$
$$\overset{OH}{|}$$

wherein R stands for an aromatic nucleus which may be substituted by an alkyl group, X stands for a substituted amino-group, one hydrogen atom of which may be substituted by substituents of the group consisting of alkyl, aralkyl, aryl, acyl and the radical of a heterocyclic nucleus attached to the nitrogen atom of the amino-group by means of a carbon atom and the other hydrogen atom of the amino group is substituted by a substituent of the group consisting of alkyl, aralkyl, aryl, acyl and wherein one or both hydrogen atoms may be substituted in such a manner that the nitrogen atom of the amino-group is member of a 5- or 6-membered heterocyclic nucleus attached to the aromatic nucleus R in ortho- or peri-position to the substituted amino-group, and "$n$" stands for one of the numbers one to three, being generally rather stable, colorless to red crystallizing substances, splitting off hydrochloric acid on heating with water which may contain an alkali or alcohol, being soluble in organic solvents and showing a high capability of reacting.

6. As new products aromatic amino-sulpho-chlorides substituted in the amino-group of the probable general formula:

$$(Cl \cdot O_2S)_n\text{—}R\text{—}N\begin{matrix}X_1\\X_2\end{matrix}$$
$$\overset{OH}{|}$$

wherein R stands for an aromatic nucleus, which may be substituted by an alkyl group, $X_1$ stands for hydrogen which may be substituted by substituents of the group consisting of alkyl, aralkyl, aryl, acyl and the radical of a heterocyclic nucleus attached to the nitrogen atom of the amino-group by means of a carbon atom, $X_2$ stands for a substituent of the group consisting of alkyl, aralkyl, aryl, acyl, and "$n$" stands for one of the numbers one to three, being generally rather stable, colorless to red crystallizing substances, splitting off hydrochloric acid on heating with water which may contain an alkali or alcohol, being soluble in organic solvents and showing a high capability of reacting.

7. As new products aromatic amino-sulpho-chlorides substituted in the amino-group of the probable general formula:

$$(Cl \cdot O_2S)_n\text{—}R\text{—}N\begin{matrix}H\\ac\end{matrix}$$
$$\overset{OH}{|}$$

wherein R stands for a naphthalene nucleus which may be substituted by an alkyl group, "$ac$" stands for an acyl radical and "$n$" for one of the numbers one to three, being generally rather stable, colorless to red crystallizing substances, splitting off hydrochloric acid on heating with water which may contain an alkali or alcohol, being soluble in organic solvents and showing a high capability of reacting.

8. As a new product 2-acetylamino-8-naphthol-6-sulphochloride, being a yellow crystalline powder, which does not melt and which dissolves readily in glacial acetic acid and acetone.

9. As a new product 2-acetylamino-5-naphthol-7-sulpho-chloride, being a yellow crystalline powder, which does not melt and which dissolves readily in glacial acetic acid and acetone.

10. As a new product 1-acetylamino-8-naphthol-3.6-disulpho-chloride, being a yellow crystalline powder melting at 188–189° C.

HUGO SCHWEITZER.
KARL BURR.